United States Patent [19]

Hochwitz et al.

[11] 4,396,081
[45] Aug. 2, 1983

[54] MECHANISM FOR INDICATING DRIVE ENGAGING FORCE

[75] Inventors: Lynn E. Hochwitz, Sheboygan Falls; Daniel W. Schaefer, Port Washington, both of Wis.

[73] Assignee: Simplicity Manufacturing, Inc., Port Washington, Wis.

[21] Appl. No.: 330,762

[22] Filed: Dec. 14, 1981

[51] Int. Cl.³ .............................................. B62D 51/04
[52] U.S. Cl. .................................... 180/19 R; 74/470; 267/175
[58] Field of Search ............. 280/332, 334, 336, 19 R; 74/470; 116/212, 283; 267/175, 177

[56] References Cited

U.S. PATENT DOCUMENTS

| | | | |
|---|---|---|---|
| 714,477 | 11/1902 | Haenze | 73/380 |
| 2,590,238 | 3/1952 | Durham | 74/470 |
| 2,696,741 | 12/1954 | Wilkin | 180/19.1 |
| 2,739,802 | 3/1956 | Pope, Jr. | 267/175 |
| 3,580,351 | 5/1971 | Mollen | 180/19.1 |
| 3,800,616 | 4/1974 | Hoffmeyer et al. | 74/470 |

Primary Examiner—Joseph F. Peters, Jr.
Assistant Examiner—Donn McGiehan
Attorney, Agent, or Firm—James E. Nilles

[57] ABSTRACT

The proper drive establishing force is indicated by the relative position of the end (91) of a control link (36) and the end (92) of a spring coil (49) of a coil spring (47) by which resilient clutch engaging force is transmitted to a transmission clutching mechanism (65,66) by a hand lever (26).

5 Claims, 4 Drawing Figures

MECHANISM FOR INDICATING DRIVE ENGAGING FORCE

BACKGROUND OF THE INVENTION

1. Technical Field

This invention relates to a control mechanism for a walk-behind vehicle such as a snowthrower having a hand operated clutching mechanism for establishing and disestablishing drive to the drive wheels.

2. Prior Art

A snowthrower with a hand operated clutch control is shown in U.S. Pat. No. 3,580,351 wherein a control linkage extends between a shiftable driving disc and a hand operated clutch control lever at a handle bar grip.

U.S. Pat. No. 714,477 illustrates the use of a coil spring in a strength testing machine wherein compression of the coil spring permits a plunger to move along a slot in a cylindrical container where it is visualized to deterine the force to which the device is subjected. This is of interest in relation to the present invention in that the present invention uses a coil spring in a hand operated control linkage for a power transmitting clutch. In the present invention, a control rod extends through and beyond an end of the coil of the coil spring in the nonclutching position of the clutch control linkage and upon the control linkage being moved to a clutching position the coil spring extends and the end of the rod extending from the coil spring retracts toward the end of the coil thereby permitting the visual observation of the clutch establishing force being applied.

BRIEF DESCRIPTION OF THE INVENTION

This invention has particular utility in a walk behind power operated vehicle such as a snowthrower wherein the drive establishing clutch in the power train between the engine and the drive wheels is hand operated through a clutch control linkage. The clutch control linkage includes a tension link which includes a first rigid part connected to a manual control lever with means for adjusting the length of such part and a resiliently deformable part including a coil spring having one end connected to the rigid part and its other end connected to a clutch controlling member. The rigid part of the control link connected to the coil spring includes a rod-like portion which extends through the spring coil in the disengaged condition of the clutch. Upon manipulation of the hand control lever to engage the clutch, the coil spring will extend and the rod portion of the link will retract within the spring coil to a position substantially flush with the end of the coil. A spring with a predetermined spring rate is selected so as to achieve a predetermined clutch engaging force upon movement of the manual clutch control lever from its clutch disengaged to its clutch engaged position. The clutch link is adjustable in length to provide a proper clutching operation at time of manufacture and to permit adjustment to compensate for wear of the control linkage and clutch parts.

It is a principal object of this invention to provide a means by which the operator of a walk behind vehicle can readily ascertain whether or not the proper force is being applied to the clutch of the vehicle power train.

DETAILED DESCRIPTION OF THE DRAWINGS

Figure 1:
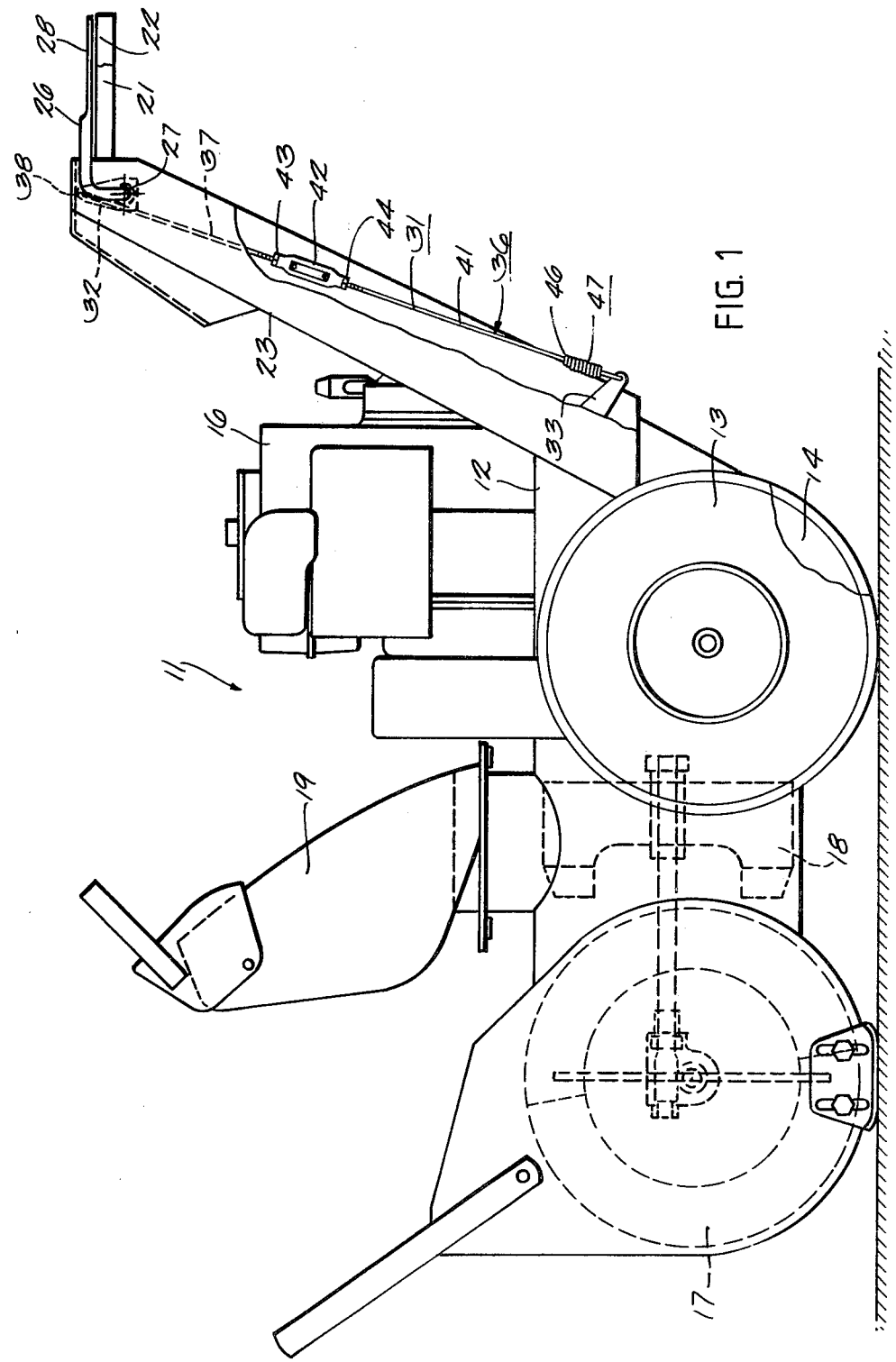
FIG. 1 is a side view of a walk behind snowthrower with portions thereof broken away for illustration purposes.

Referring to FIG. 1, the snowthrower 11 in which the present invention is incorporated includes a frame 12 supported by a pair of drive wheels 13, 14 which are driven by an engine 16 through a drive train which hereinafter will be explained. The snowthrower 11 includes a front transverse auger 17, an impeller 18 and a snow chute 19. The snowthrower 11 is operated by an operator walking behind it and is provided with a pair of handle bars 21, 22 secured to an upwardly and rearwardly extending frame extension 23. A manually operated hand lever 26 is pivotally connected to the frame extension 23 on a transverse horizontal axis 27 and includes a rearwardly extending portion 28 which lies above and adjacent to the handle bar 21 in its drive establishing position. A drive establishing linkage 31 connects at its upper end to an arm 32 secured to the hand lever 26. More specifically, the linkage 31 includes a rigid portion or link 36 which is made up of an upper rod-like link part 37 having its upper end pivotally connected to the arm 32 at point 38 and a lower rod-like link part 41. The adjacent ends of link parts 37 and 41 are threaded for threaded engagement with complimentary aligned threaded openings in a turnbuckle 42 which is maintained a fixed relation to the link parts 37, 41 by lock nuts 43, 44. As shown more fully in FIGS. 3 and 4 the lower link part 41 extends through the upper reduced diameter end 46 of a coil spring 47 and includes an indicator portion 48 which extends through the central part of the coil spring 47 terminating near a lower end of its coil 49. The lower end of the coil spring 47 has a hook portion 51 which engages an opening 52 in a clutch control member in the form of an intermediate lever 33. The lower rod part 41 has an enlarged portion 53, formed by pinching, which presents a shoulder in abutment with lower ends of the reduced diameter portion 46 of the spring 47 thus serving as a force transmitting connection between the upper end of the spring and the link part 41.

Figure 2:
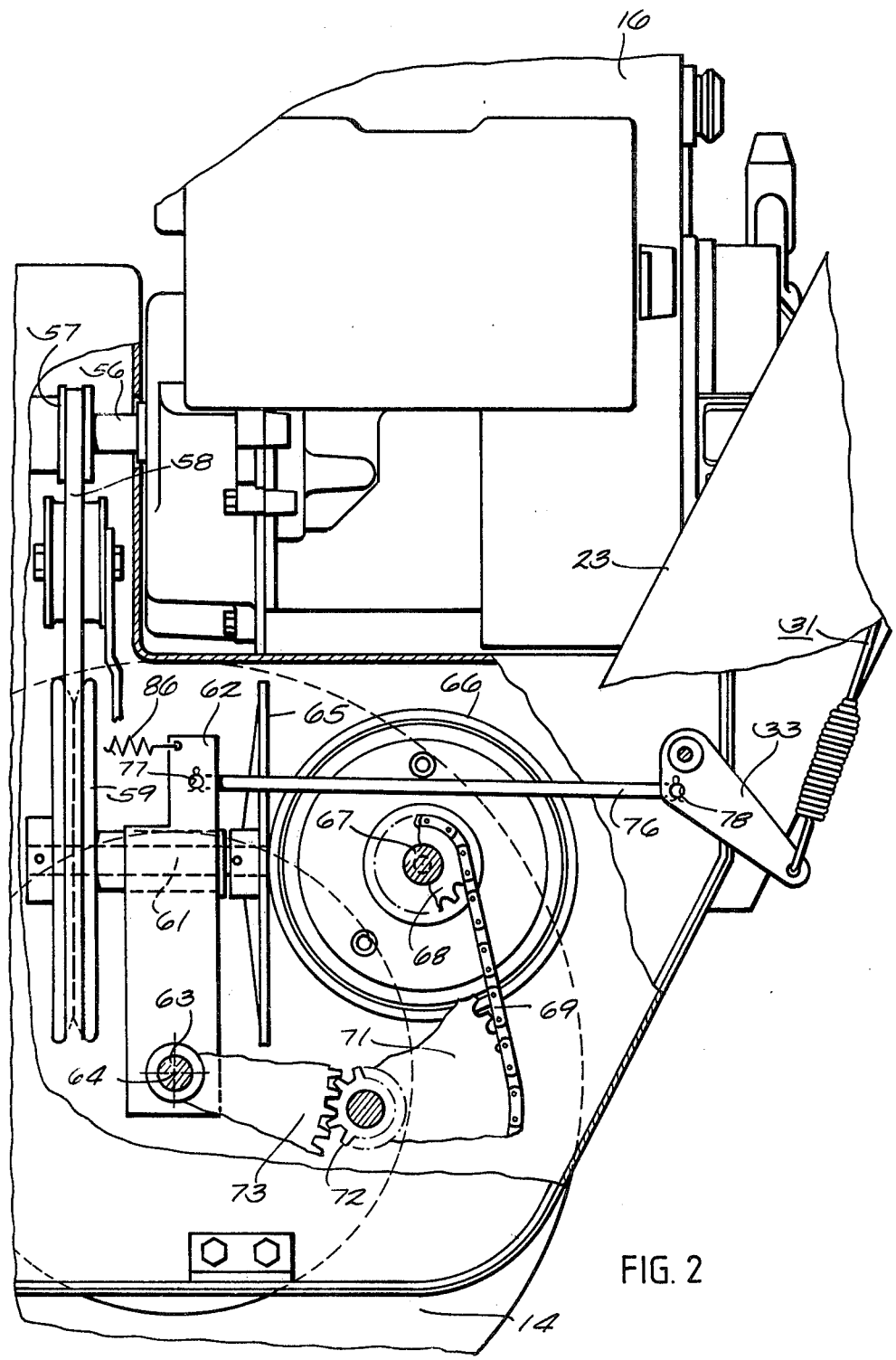
FIG. 2 is an enlarged view of the central portion of the snowthrower with protions removed to show components of the power drive train and a clutch control linkage.

Referring to FIG. 2, the engine 16 has an output shaft 56 with a V-belt pulley 57 secured thereto. A V-belt 58 engages the engine shaft pulley 57 and also a large V-belt pulley 59 secured to shaft 61. The shaft 61 is journalled in a bearing mount 62 which is pivoted on the wheel mounting shaft 63 for a limited swinging movement about the wheel axis 64. A drive disc 65 is secured to the drive shaft 61 and upon rotation is operative to transmit driving torque to a transmission friction wheel 66. The friction wheel 66 is secured to a shaft 67 to which an output sprocket 68 is secured. The sprocket 68 drives the wheels 13, 14 through a chain 69, a sprocket 71 and speed reduction gears 72, 73. Gear 73 is secured to the wheel axle or shaft 63. Drive is established and disestablished through the power train just described by pivoting the mount 62 for the drive disc 65 about the transverse axis 64. Thus, clutching movement is effected by the drive establishing linkage 31 which, in addition to link 36, spring 47 and lever 33, includes a longitudinally extending clutch operating link 76 pivotally connected at its front end to an opening 77 in the disc mount 62 and at its rear end to an opening 78 in the lever 33 in spaced relation to the pivot axis 81 on which the lever 33 is mounted on the frame 12 by a pivot shaft 82. A relatively light tension spring 86, only part of which is shown in FIG. 2, is operatively interposed between the disc mount 62 and the frame 12 to back the disc 65 away from the friction wheel 66 when the clutch control, including control lever 26 and linkage 31, is in its clutch disengaging condition.

OPERATION

Figure 3:
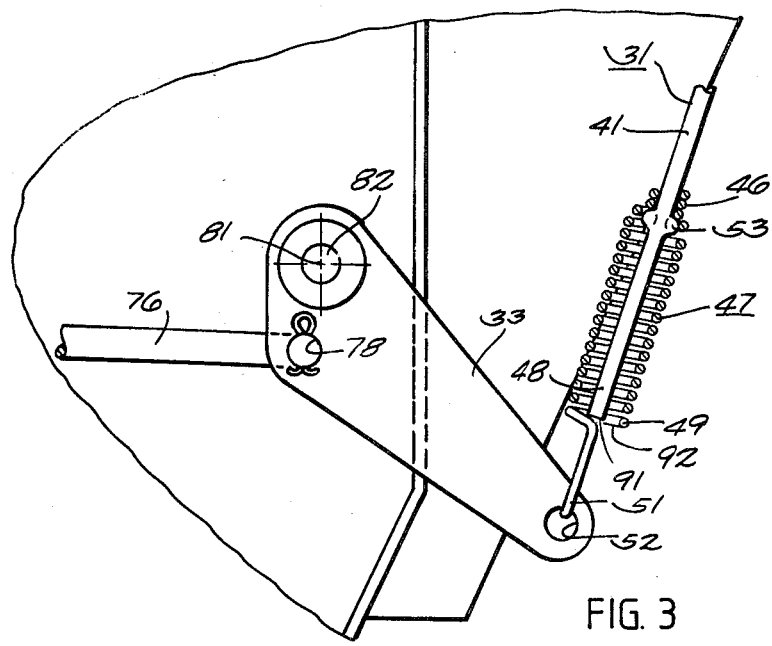
FIG. 3 is an enlarged view of the mechanism for indicating drive engaging force with the clutch control adjusted to its drive establishing position.
Figure 4:
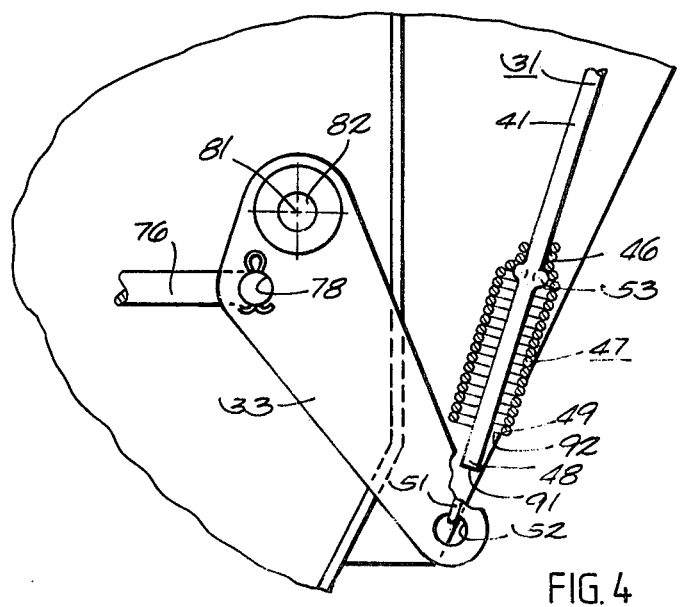
FIG. 4 is a view of the mechanism showing FIG. 3 with the clutch control in drive disestablishing position.

As shown in FIGS. 1, 2 and 3, the transmission, comprising disc 65 and friction wheel 66, is in a drive establishing condition in which the engine 16 transmits driving torque to the traction wheels 13, 14 of the snowthrower 11. The friction disc 65 and wheel 66 also serve as a clutch for the vehicle drive train from the engine 12 to the wheels 13, 14 and, as illustrated in FIGS. 1, 2 and 3, the clutch is in an engaged conditon. The clutch engaged condition is achieved by the operator placing his hand on the hand lever 26 and pivoting it downwardly about its pivot axis 27 into abutment with the top of the handle bar 21. Thus with a single hand the operator can grip the handle bar 21 and hold the clutch in its engaged position. Clutch engaging movement of the hand lever 26 causes the link 36 to be moved upwardly and the shoulder 53 of link part 41 pulls the upper end of the spring 47 upwardly by virtue of its thrust transmitting connection with the reduced diameter portion 46 of the spring 47. The lower end of the spring 47 resiliently urges the lever 33 to rotate upwardly and rearwardly causing the link 76 to pivot the disc mount 62 rearwardly about transverse axis 64, overcoming the force of the back-off tension spring 86 to bring the drive disc 65 into torque transmitting engagement with the friction wheel 66. The proper engaging force is applied to the driving disc when the coil 49 of the spring 47 elongates sufficiently to bring the lower end 91 of indicator portion 48 of the link part 41 to a position closely adjacent or even with the lower end 92 of the spring coil 49. The operator can easily visualize this relative position of the end 92 of the spring coil 49 and the rod end 91 from a position at the rear of the snowthrower. If the ends 91, 92 are not in alignment the operator can loosen the lock nuts 43, 44 on the link 36 and turn the turnbuckle to shorten or lengthen the link 36 so as to achieve the proper application of drive establishing force as indicated by the rod and spring ends 91, 92 being at the same axial position when the clutch is engaged.

The embodiments of the invention in which an exclusive property or privilege is claimed are defined as follows:

1. In a control for establishing drive in a walk-behind vehicle, comprising:
   a manually operated clutch control linkage including
   a hand-operated lever shiftable between clutch engaged and clutch disengaged positions,
   an elongated control link having first and second parts interconnected by fastening means permitting the parts to be adjusted relative to one another to vary the length of the link,
   means connecting one of said parts to said hand-operated lever,
   a clutch control member shiftably mounted on the vehicle for the movement between clutch engaged and clutch disengaged positions, and
   a coil spring having one of its ends connected to said clutch control member and the other of its ends connected to said second part of said control link, said second part including a portion extending axially through the inside of the coil of said spring with an end portion of said second part extending beyond the end coil when the manually operated lever is in its clutch disengaged position and the terminous of said end portion being closely adjacent an end of the coil when said manually operated lever is moved to its clutch engaged position.

2. The control of claim 1 wherein adjacent ends of said first and second parts are threaded and said fastening means includes a turnbuckle with aligned threaded openings at its opposite ends in threaded engagement with said threaded ends of said first and second parts.

3. In a control for establishing drive in a walk-behind vehicle, comprising:
   a manually operated clutch control linkage including
   a hand-operated lever shiftable between clutch engaged and clutch disengaged positions,
   a clutch control member shiftably mounted on said vehicle for movement between clutch engaged and clutch disengaged positions,
   a coil tension spring having one end connected to said clutch control member to impart shifting movement thereto, and
   an elongated link having one end connected to said hand-operated lever whereby said link moves generally in its direction of elongation upon shifting movement of said lever, said link including a portion near its other end connected in thrust transmitting relation to the other end of said coil spring and a part extending through the coil of said coil spring with an end terminating near the remote end of said coil,
   the relative position of said end of said link part and the remote end of said coil of said spring being observable and indicating the magnitude of the clutch engaging force being transmitted through the linkage.

4. The control of claim 3 wherein said end of said link part extends beyond said remote end of said coil when said hand-operated lever is in its clutch disengaged position and is adjacent to said remote end of said coil when said hand-operated lever is in its clutch engaged position.

5. The control of claims 3 or 4 wherein said elongated link is selectively adjustable in length.

* * * * *